US008417933B2

(12) United States Patent
Lee et al.

(10) Patent No.: US 8,417,933 B2
(45) Date of Patent: Apr. 9, 2013

(54) INTER-ENTITY COUPLING METHOD, APPARATUS AND SYSTEM FOR SERVICE PROTECTION

(75) Inventors: Byung-Rae Lee, Seoul (KR); Sung-Oh Hwang, Yongin-si (KR); Wuk Kim, Gwacheon-si (KR)

(73) Assignee: Samsung Electronics Co., Ltd. (KR)

( * ) Notice: Subject to any disclaimer, the term of this patent is extended or adjusted under 35 U.S.C. 154(b) by 1361 days.

(21) Appl. No.: 11/409,151

(22) Filed: Apr. 21, 2006

(65) Prior Publication Data
US 2007/0061569 A1 Mar. 15, 2007

(30) Foreign Application Priority Data

Sep. 15, 2005 (KR) .................. 10-2005-0086409

(51) Int. Cl.
*H04L 29/06* (2006.01)
(52) U.S. Cl.
USPC ........... 713/150; 713/187; 713/176; 713/163; 705/71; 380/277; 380/279
(58) Field of Classification Search .................. 713/150; 726/27; 705/71
See application file for complete search history.

(56) References Cited

U.S. PATENT DOCUMENTS

| 5,917,912 | A * | 6/1999 | Ginter et al. ........... 713/187 |
| 6,636,968 | B1 | 10/2003 | Rosner et al. |
| 2002/0163481 | A1 | 11/2002 | Takamine |
| 2003/0028805 | A1 * | 2/2003 | Lahteenmaki ........... 713/201 |
| 2003/0046539 | A1 | 3/2003 | Negawa |
| 2003/0229681 | A1 * | 12/2003 | Levitan ................. 709/218 |
| 2004/0093273 | A1 * | 5/2004 | Laurent et al. ............ 705/26 |
| 2004/0117490 | A1 * | 6/2004 | Peterka et al. ........... 709/229 |
| 2005/0286722 | A1 * | 12/2005 | Aboba et al. ............ 380/277 |
| 2006/0265338 | A1 * | 11/2006 | Rutkowski et al. ....... 705/71 |

FOREIGN PATENT DOCUMENTS

| JP | 2002-358244 | 12/2002 |
| JP | 2003-069547 | 3/2003 |
| JP | 2004-023237 | 1/2004 |
| KR | 10-2005-0040644 | 5/2005 |
| WO | WO 2006048039 A1 * | 5/2006 |

OTHER PUBLICATIONS

M. Handley et al "SDP: Session Description Protocol", The Internet Society, 2006.*
Open Mobile Alliance: "Service and Content Protection for Mobile Broadcast Services", Draft Version 1.0, Internet Citation, Aug. 29, 2005. Open Mobile Alliance: "Mobile Broadcast Services Architecture", Draft Version 1.0, Internet Citation, Apr. 29, 2005.
Open Mobile Alliance: "DRM Specification V2.0", Draft Version 2.0, Internet Citation, Apr. 20, 2004.
Nariman Molavi et al.: "A Security Study of Digital TV Distribution Systems", Thesis, Jun. 1, 2005.

* cited by examiner

*Primary Examiner* — Taghi Arani
*Assistant Examiner* — Jason Lee
(74) *Attorney, Agent, or Firm* — The Farrell Law Firm, P.C.

(57) ABSTRACT

Disclosed is an inter-entity coupling method for service protection in a broadcast environment including a terminal and a broadcast network, which includes a Broadcast Service Application (BSA), a Broadcast Service Distribution (BSD) and a Broadcast Service Management (BSM) function. The method includes executing enrollment and service joining procedures for the terminal, wherein the terminal acquires a group key in the enrollment procedure and acquires a Rights Object (RO) for the service in the service joining procedure; receiving a message including a traffic key in the terminal; acquiring the traffic key from the message using the RO; receiving an encrypted service encrypted by the BSD in the terminal; and decrypting the encrypted service using the traffic key in the terminal.

19 Claims, 6 Drawing Sheets

(a) | ID_T | RND(1) | TS(1) | Sign_T(RND(1) ∥ TS(1)) |

(b) | ID_SP | RND(2) | E(PK_T,GK) | TS(2) | Sign_SP(ID_SP ∥ RND(2) ∥ GK Information ∥ TS(2)) |

(c) | ID_T | ID_Service | RND(3) | TS(3) |

(d) | ID_SP | ID_Service | RND(4) | E(GK,RO) | TS(4) | Sign_SP(ID_SP ∥ ID_Service ∥ RND(4) ∥ E(GK,RO) ∥ TS(4)) |

(e) | ID_SP | E(SK,TK) | TS(5) | Sign_SP(ID_SP ∥ E(SK,TK) ∥ TS(5)) |

(f) | E(TK,ID_SP ∥ Service ∥ TS(6)) |

FIG.5

INTER-ENTITY COUPLING METHOD, APPARATUS AND SYSTEM FOR SERVICE PROTECTION

PRIORITY

This application claims priority to an application entitled "Inter-Entity Coupling Method, Apparatus And System For Service Protection" filed in the Korean Industrial Property Office on Sep. 15, 2005, and assigned Ser. No. 2005-86409, the contents of which are incorporated herein by reference.

BACKGROUND OF THE INVENTION

1. Field of the Invention

The present invention relates to an inter-entity coupling method, an inter-entity coupling apparatus, and an inter-entity coupling system for service protection in a broadcast environment.

2. Description of the Related Art

In general, a broadcast service refers to a service scheme in which if a server controlling the broadcast service transmits an encrypted service, then a plurality of terminals can receive the encrypted service.

At present, broadcast services have been changing into charged services (e.g., pay-per-view, subscription, etc. services). In this regard, a Digital Rights Management (DRM) technology providing convenience and flexibility and using a user's Rights Object (RO) has been introduced to provide copyright protection and for preventing unauthorized reproduction and distribution of content.

Service and/or content provided from a service provider is/are protected as shown in FIG. 1 which is a block diagram illustrating the configuration of a conventional DRM system. The DRM technology is a typical security technique for protecting content and stipulates the rights of use for encrypted content. Entities playing roles in DRM communication include a terminal system 3 which reproduces content using an RO, and a Rights Issuer (RI) which creates and issues the RO defining the rights of use for the content and so forth. As shown in FIG. 1, the RI belongs to a service provider 5.

The terminal 3 establishes a safe channel through an authentication procedure with the RI, and acquires the RO over the established channel. At this time, since the RO is decrypted using the DRM technology, it is possible to prevent content from being used without authorization. That is, a user cannot enjoy multimedia information included in the encrypted content before the encrypted content is decrypted and executed using the DRM technology and the RO.

Conventional service and/or content protection methods perform an authentication procedure between a service provider and only one terminal. A typical related standard in a mobile communication environment includes the Open Mobile Alliance (OMA) DRM v2.0. However, a standard related to service protection for a plurality of terminals using the broadcast service in the mobile communication environment has not yet been proposed.

Furthermore, although several content protection methods in the broadcast environment exist, for example, an Multimedia Broadcast/Multicast service (MBMS) and a BroadCast MultiCast Service (BCMCS) exist using the Third Generation Partnership Project (3GPP), 3GPP2, etc., the methods are dependent on networks such as the 3GPP and so forth.

As stated above, conventionally, only dependent service and/or content protection methods, such as an MBMS method dependent on the existing 3GPP network, exist as opposed to methods which are independent of specific networks. Thus, there is a need for a structure of entities participating in a broadcast network and a method for coupling the respective entities with each other, which can be applied to various networks.

SUMMARY OF THE INVENTION

Accordingly, the present invention has been made to solve at least the above-mentioned problems occurring in the prior art, and it is an object of the present invention is to provide an inter-entity coupling method, an inter-entity coupling apparatus and an inter-entity coupling system for service protection in a broadcast environment.

In order to accomplish this object, in accordance with one aspect of the present invention, there is provided an inter-entity coupling method for service protection in a broadcast environment including a terminal and a broadcast network, which includes a Broadcast Service Application (BSA), a Broadcast Service Distribution (BSD) and a Broadcast Service Management (BSM), the method comprising executing enrollment and service joining procedures for the terminal, wherein the terminal acquires a group key in the enrollment procedure and acquires a Rights Object (RO) for a service in the service joining procedure; receiving a message including a traffic key in the terminal; acquiring the traffic key from the message using the RO; receiving an encrypted service encrypted by the BSD from the BSD in the terminal; and decrypting the encrypted service using the traffic key in the terminal.

In accordance with another aspect of the present invention, there is provided an inter-entity coupling system for service protection in a broadcast environment, the system comprising a terminal for receiving a service; a content provider for creating the service and delivering the created service to a Broadcast Service Application (BSA); the BSA for the receiving the created service and transmitting the created service to a Broadcast Service Distribution (BSD); a BSM for executing enrollment and service joining management procedures with the terminal, and creating encryption keys and messages used for encrypting the service; a Broadcast Service Distribution (BSD) for receiving the message including the encryption key created in the BSM, encrypting the created service from the BSA and transmitting messages including the encryption key and the encrypted service to the terminal; and wherein the terminal decrypts the encrypted service by using the encryption keys acquired from the BSD or BSM.

In accordance with another aspect of the present invention, there is provided an inter-entity coupling terminal apparatus for service protection in a broadcast environment including the terminal and a broadcast network, which includes a Broadcast Service Application (BSA), a Broadcast Service Distribution (BSD), and a Broadcast Service Management (BSM), the apparatus comprising a first component receiving messages and encrypted services from the BSD; a second component acquiring encryption keys to decrypt the encrypted services, and transmitting to the first component, while executing enrollment and service joining management procedures with BSM.

In accordance with another aspect of the present invention, there is provided an inter-entity coupling terminal apparatus for service protection in a broadcast environment including the terminal and a broadcast network, which includes a Broadcast Service Application (BSA), a Broadcast Service Distribution (BSD), and a Broadcast Service Management (BSM), the apparatus comprising a Digital Rights Management (DRM) module for managing enrollment, service joining, and use of service content; a communication module for transmitting and receiving a message between the BSM, and receiving a traffic key message and an encrypted service from the BSD; and an authentication module for acquiring a group key from verifying an message received from the BSM or the BSD, acquiring an encryption key.

In accordance with another aspect of the present invention, there is provided An inter-entity coupling terminal apparatus for service protection in a broadcast environment including a terminal and a broadcast network, which includes a Broadcast Service Application (BSA), a Broadcast Service Distribution (BSD), and a Broadcast Service Management (BSM), the apparatus including a Service Protection-Decryption (SP-D) component for receiving an encryption key from the BSD, and decrypting an encrypted service transmitted from the BSD; and a Service Protection-Client (SP-C) component for executing enrollment and service joining, and transmitting an encryption key for decrypting the encrypted service to the SP-D component.

BRIEF DESCRIPTION OF THE DRAWINGS

The above and other objects, features and advantages of the present invention will be more apparent from the following detailed description taken in conjunction with the accompanying drawings, in which:

FIGS. 5a-5F are diagrams illustrating the format of messages according to a service protection scheme of the present invention.

DETAILED DESCRIPTION OF THE PREFERRED EMBODIMENT

Figure 1:
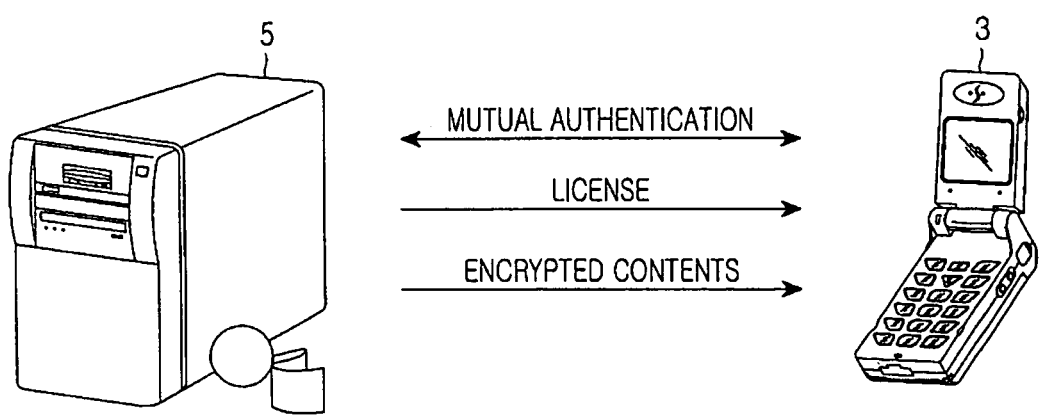
FIG. 1 is a block diagram illustrating the configuration of a conventional common DRM system.

Hereinafter, preferred embodiments of the present invention will be described with reference to the accompanying drawings. It should be noted that the similar components are designated by similar reference numerals although they are illustrated in different drawings. Also, in the following description, a detailed description of known functions and configurations incorporated herein will be omitted when it may obscure the subject matter of the present invention.

The present invention implements a capability to protect a broadcast service. More specifically, the present invention is drawn to a structure for service protection in a broadcast network, and a function of each entity in such a structure. To this end, the present invention enables a service broadcast to a terminal to be securely transmitted and reproduced according to the configurations and the roles of the respective entities including the terminal.

Figure 2:
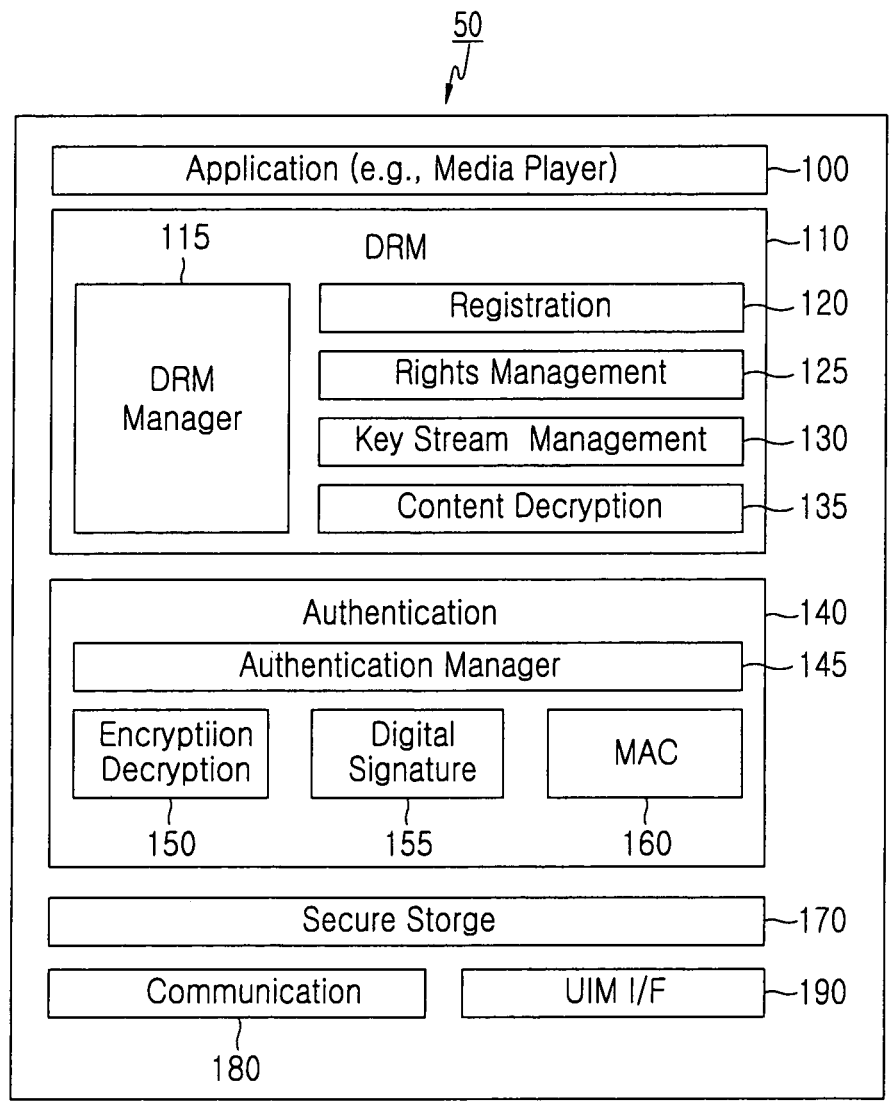
FIG. 2 is a block diagram illustrating an internal structure of a terminal in accordance with the present invention.

Hereinafter, a terminal executing the above and other functions according to the present invention will be described with reference to FIG. 2. The terminal 50 to which the present invention is applied includes an application module 100, a DRM module 110, an authentication module 140, a secure storage module 170, a communication module 180, and a UIM I/F (User Identification Module interface) module 190.

The application module 100 is a module, such as a media player, and serves to reproduce decrypted contents provided from the DRM module 110. The DRM module 110 functions to manage enrollment, service joining, and use of content.

The DRM module 110 includes a DRM manager module 115, a registration module 120, a rights management module 125, a key stream management module 130, and a content decryption module 135. Of these modules, the registration module 120 executes operations according to an enrollment procedure, the rights management module 125 manages interpretation and use of an RO acquired at the service joining. The key stream management module 130 executes decryption of a traffic key encrypted by a service key in the RO, and the content decryption module 135 executes decryption of encrypted content using the traffic key. The DRM manager module 115 controls the overall operation of DRM-related modules.

The authentication module 140 manages authentication protocol execution between a user identification module and a network (for example, a service provider), and creates and verifies a message using its sub-modules. This authentication module 140 includes an authentication manager 145 for controlling protocol execution, managing an authentication function, and controlling sub-modules of the authentication manager 145. The sub-modules of the authentication manager 145 include an encryption/decryption module 150 for executing encryption and decryption operations, a digital signature module 155 for signing an electronic signature, and an MAC module 160 for executing an MAC (Media Access Control) operation.

To be specific, the DRM module 110 and the authentication module 140 verify an enrollment response message, which is received from a BSM 40 (e.g., see, FIG. 3) according to an embodiment of the present invention as will be described later, to acquire a group key, acquire an RO from a service joining response message received from the BSM 40 using the group key, acquire a traffic key using the RO if a traffic key message is received from a BSD 30, and decrypt an encrypted service transmitted form the BSD 30 using the acquired traffic key.

The communication module 180 is responsible for transmission and/or reception to and/or from a network. In particular, the communication module 180 receives a message from the network and transmits a response message in response to the received message. According to an embodiment of the present invention, the communication module 180 receives a message from the BSD 30 (e.g., see FIG. 3) over a broadcast channel. Also, the communication module can optionally 180 transmit and/or receive a message to and/ or from the BSM 40 over a bidirectional channel, and can receive a traffic key message and an encrypted service from the BSD 30.

The secure storage module 170 stores an encryption key, etc., and the UIM interface module 190 controls communication with the user identification module (UIM).

Hereinafter, a description will be given of function-by-function entities which execute service protection functions according to a preferred embodiment of the present invention.

Figure 3:
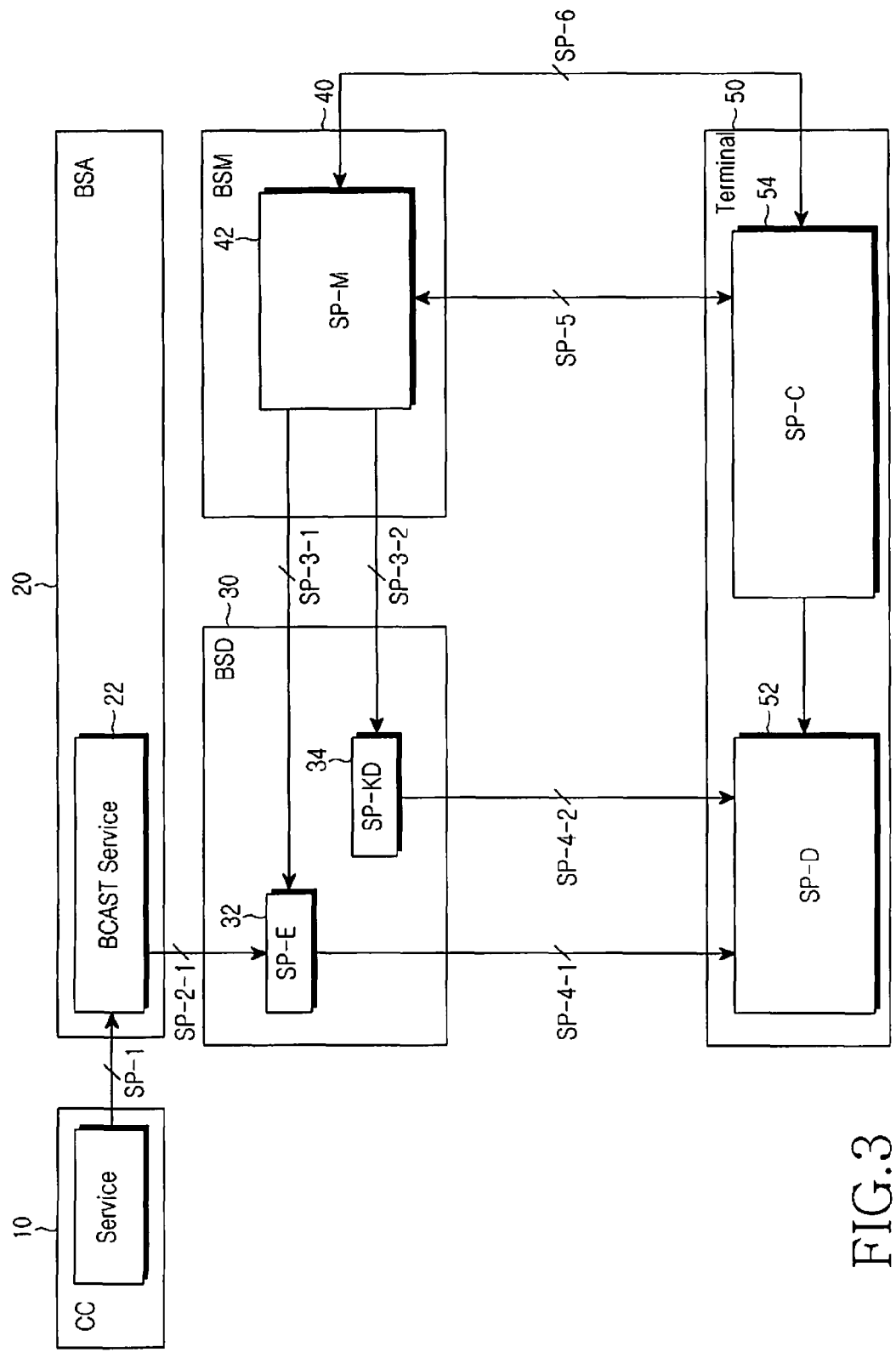
FIG. 3 is a block diagram illustrating a structure of a broadcast system for service protection in accordance with the present invention.

FIG. 3 is a block diagram illustrating the structure of the broadcast system for service protection according to the present invention. Entities for the application of DRM in a broadcast service according to the present invention, include a CC 10 (content creator, a BSA 20, a BSD 30, a BSM 40 and a terminal 50. The CC 10 represents a contents creation agency for creating contents and a service. The BSA 20 represents an application using a broadcast network. The BSD 30 provides distribution and service protection functions for the broadcast service. The BSM 40 executes a broadcast service joining management function. By delivering the broadcast service to the terminal 50 through these function-by-function entities, the service is provided (i.e., (becomes available) to the terminal 50.

Hereinafter, a description will be given of components in the above-referenced function-by-function entities in order to provide a secure broadcast service between functions.

A BCAST (broadcast) service component 22 executes a procedure of creating digital content in the form a service. An SP-E (Service Protection-Encryption) component 32 encrypts and broadcasts the service. An SP-M (Service Protection-Management) component 42 executes an encryption key creation function, a service joining management function and so forth. An SP-KD (Service Protection-Key Distribution) component 34 transfers the encryption key, etc., to the terminal 50. An SP-D (Service Protection-Decryption) component 52 decrypts the encrypted service transmitted from the SP-E component 32. An SP-C (Service Protection-Client) component 54 executes procedures of enrollment and service joining with the SP-M component 42, and transfers acquired encryption keys to the SP-D component 52.

In order to provide the broadcast service to the terminal 50, the terminal 50 must be enroll with a broadcast network i.e., the BSM 40, and thereafter join the broadcast service. The terminal having completed enrollment and service joining can be provided with a service RO and can therefore receive the service.

Figure 4:
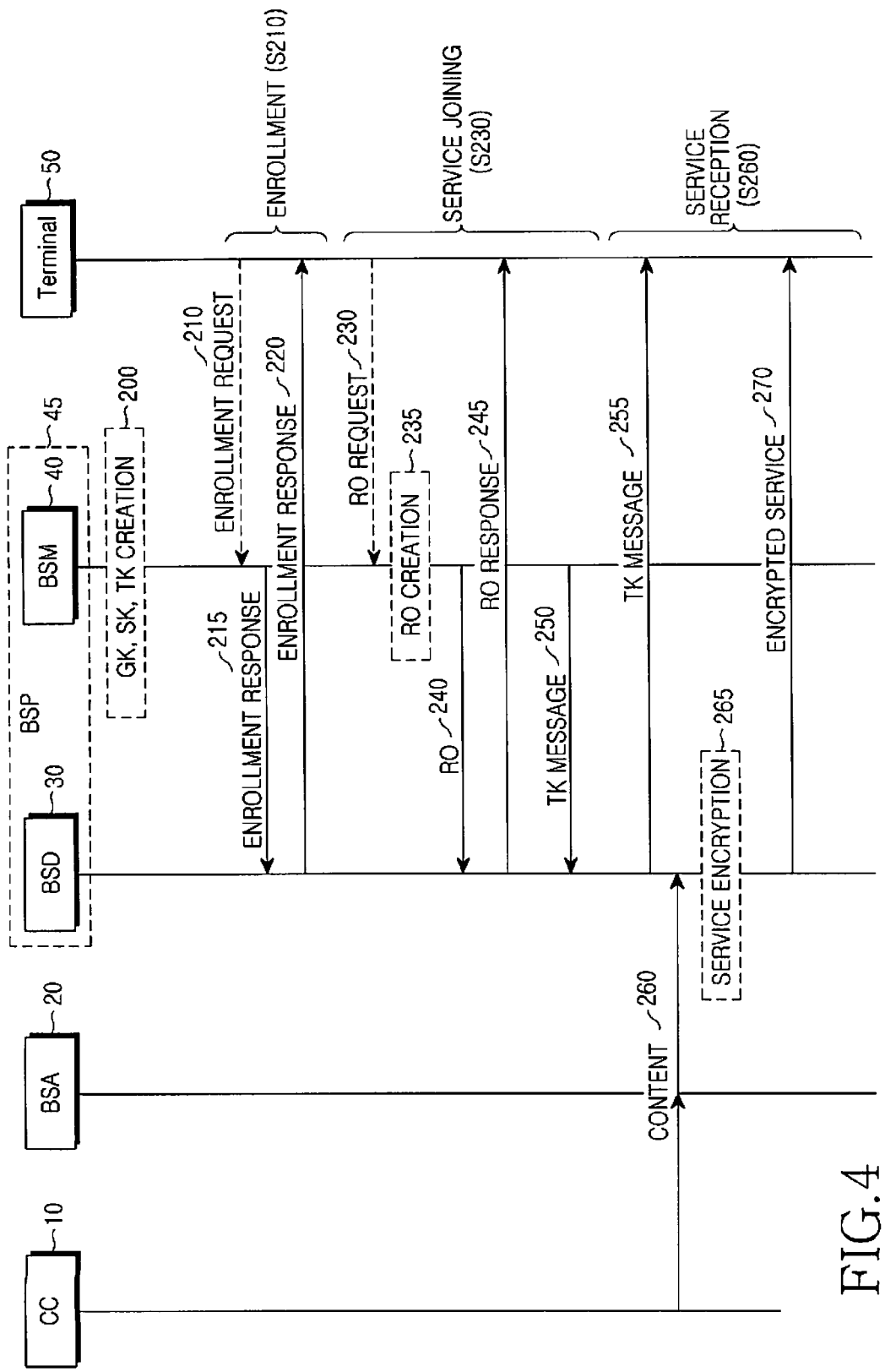
FIG. 4 is a flow diagram illustrating the flow of a message transmitted/received according to a service protection method in a broadcast channel in accordance the present invention.

Procedures, defining how the terminal executes the enrollment and service joining processes in order to receive a secure broadcast service will be discussed with reference to FIG. 4 below. FIG. 4 is a flow diagram illustrating the flow of a message transmitted/received according to a service protection method in a broadcast channel in accordance with the present invention.

Referring to FIG. 4, a service protection procedure begins with step 200 in which the SP-M component 42 of the BSM 40 creates a Group Key (GK), a Service Key (SK) and a Traffic Key (TK). The Group Key is an encryption key corresponding to a group to which the terminal belongs and the Service Key is used for decrypting an encrypted Traffic Key. The Traffic Key is used for encrypting content for transfer to a terminal.

Thereafter, in step 210, the terminal 50 transmits an enrollment request message to the BSM 40 in order to become enrolled with the BSM 40. At this time, since the terminal cannot transmit the message directly to the BSM 40 in view of the characteristics of the broadcast channel, it transmits the message to the BSM 40 through an out-of-band scheme. An example of the out-of-band scheme can include a scheme in which the terminal 50 transmits the enrollment request message to the BSM 40 via specific agency such as a PC (personal computer). The enrollment request message has a format as illustrated in FIG. 5A. Referring to FIG. 5A, the format of the enrollment request message includes a plurality of fields, each of which is described below and corresponds with an ID-T field representing terminal identification information. These fields, also include an RND(1) fixed representing random number information, a TS(1) field representing a first time stamp, and a Sign_T field representing an electronic signature. Among these fields, the electronic signature field (i.e., the sign_T field) includes information which the terminal signs using its own encryption key is set, thus enabling the BSM 40 to recognize a message transmitted from a specific subscriber. The electronic signature is an optional field.

If receiving such an enrollment request message, the SP-M component 42 of the BSM 40 checks the terminal 50. Thereupon, when creating an enrollment response message in response to the enrollment request message, the SP-M includes GK of a corresponding group to which the terminal 50 belongs, and delivers the enrollment response message to the BSD 30 in step 215. In step 220, the SP-KD component 34 of the BSD 30 transmits the received enrollment response message to the terminal 50. The enrollment response message can have a format as illustrated in FIG. 5B. In FIG. 5B, the enrollment response message includes information in which a group key has been encrypted with the public key of the terminal 50. This information may be briefly expressed by a formula $E(K, D)$. This formula represents an operation for encrypting data D with an encryption key K. Accordingly, the information, in which the group key GK has been encrypted with the public key $PK\_T$ of the terminal 50, may be expressed by a formula $E(PK\_T, GK)$. Herein, the E represents an Encryption.

If the enrollment response message is broadcast through the SP-KD component 34 over a broadcast channel, the terminal 50 decrypts encrypted information through the SP-D component 52, checks a subject, which has created the message, by verifying an electronic signature using a public key $PK\_T$ of the BSM 40, etc., and verifies whether the message is a correct message. If the SP-D component 52 of the terminal 50 fails in the verification of the enrollment response message, the enrollment is impossible. However, if succeeding in the verification, the terminal 50 can acquire the GK from the enrollment response message. The terminal 50 can acquire the group key GK, which is an encryption key corresponding to a subscriber group, through the enrollment procedure (S210).

After completing the enrollment, the terminal 50 may request service joining to the SP-M component 42 of the BSM 40. Since such service joining corresponds to a procedure for acquiring an RO for service, the terminal 50 may transmit an RO request message to the SP-M component 42 of the BSM 40 in step 230. In this case, because of the characteristics of the broadcast channel, the terminal 50 does not directly transmit the message, but rather, transmits the RO request message to the SP-M component 42 of the BSM 40 using the out-of-band scheme. The RO request message has a format as illustrated in FIG. 5C, and includes an ID_Service field representing the ID of a service which the terminal 50 desires to join.

In response to the RO request message, the SP-M component 42 of the BSM 40 creates RO including a service key having been previously created in step 235, and delivers an RO response message including an RO encrypted with the group key to the SP-KD component 34 of the BSD 30 in step 240. Then, in step 245, the BSD 30 transmits, using the broadcast channel, the RO response message, i.e., a service joining response message, to the terminal 50 which requested the service joining. Thus, if the SP-D component 52 of the terminal 50 receives the RO response message, the terminal 50 verifies the RO response message, and then decrypts the RO using the group key, which has been acquired in the enrollment procedure, to acquire the RO. The RO response message has a format as illustrated in FIG. 5D. In this way, the terminal 50 can acquire the RO through the above-mentioned service joining procedure (S230).

Thereafter, in step 250, the SP-M component 42 of the BSM 40 delivers a TK message to the BSD 30. In step 255, the SP-KD component 34 of the BSD 30 broadcasts the TK message, in which the traffic key is encrypted with the service key, to the terminals. This TK message has a format as illustrated in FIG. 5E, and includes information in which the traffic key is encrypted with the service key. If receiving such a TK message, the SP-KD component 52 of the terminal 50 decrypts the encrypted traffic key with the service key to acquire the traffic key. Here, the RO, acquired in the service joining procedure, includes the service key, so that the terminal 50 can acquire the traffic key using the service key.

Meanwhile, contents are created in the CC 10, and the created contents are delivered to the SP-E component 32 of the BSD 30 through the BCAST service component 22 the BSA 20 in step 260. here, the BCAST service component 22 functions to convert the contents delivered from the CC 10 into a service form suitable for broadcasting through processing procedures. Then, in step 265, the SP-E component 32 of the BSD 30 executes service encryption for the contents and additional information, using the traffic key according to a network or transmission protection technology such as IPSec (IP Security), SRTP (Secure Realtime Transmission Protocol) and/or the like. Then, in step 270, the SP-E component 32 of the BSD 30 broadcasts the encrypted service to the terminals. The encrypted service has a format as illustrated in FIG. 5F. If receiving the encrypted service, the SP-D component 52 of the terminal 50 decrypts the received service with the traffic key, thereby making the service available to the terminal 50. For example, if the contents are decrypted with the traffic key, the decrypted contents may be reproduced through the application 100. In this way, the terminal 50 acquires the traffic key through the service reception procedure (S260), and can reproduce the encrypted and transmitted service using the traffic key.

In the foregoing, a description has been given for a case where a terminal uses an encrypted service over a broadcast channel. Hereinafter, a case where a user requests enrollment and service joining in person through a terminal to use an encrypted service in accordance with the present invention will be described. This method will describe a case of using an encrypted service through the bidirectional channel, and a description will be given of a service protection method in a bidirectional channel with reference to FIG. 6 which is a flow diagram illustrating a message transmitted/received according to the present invention.

Figure 6:
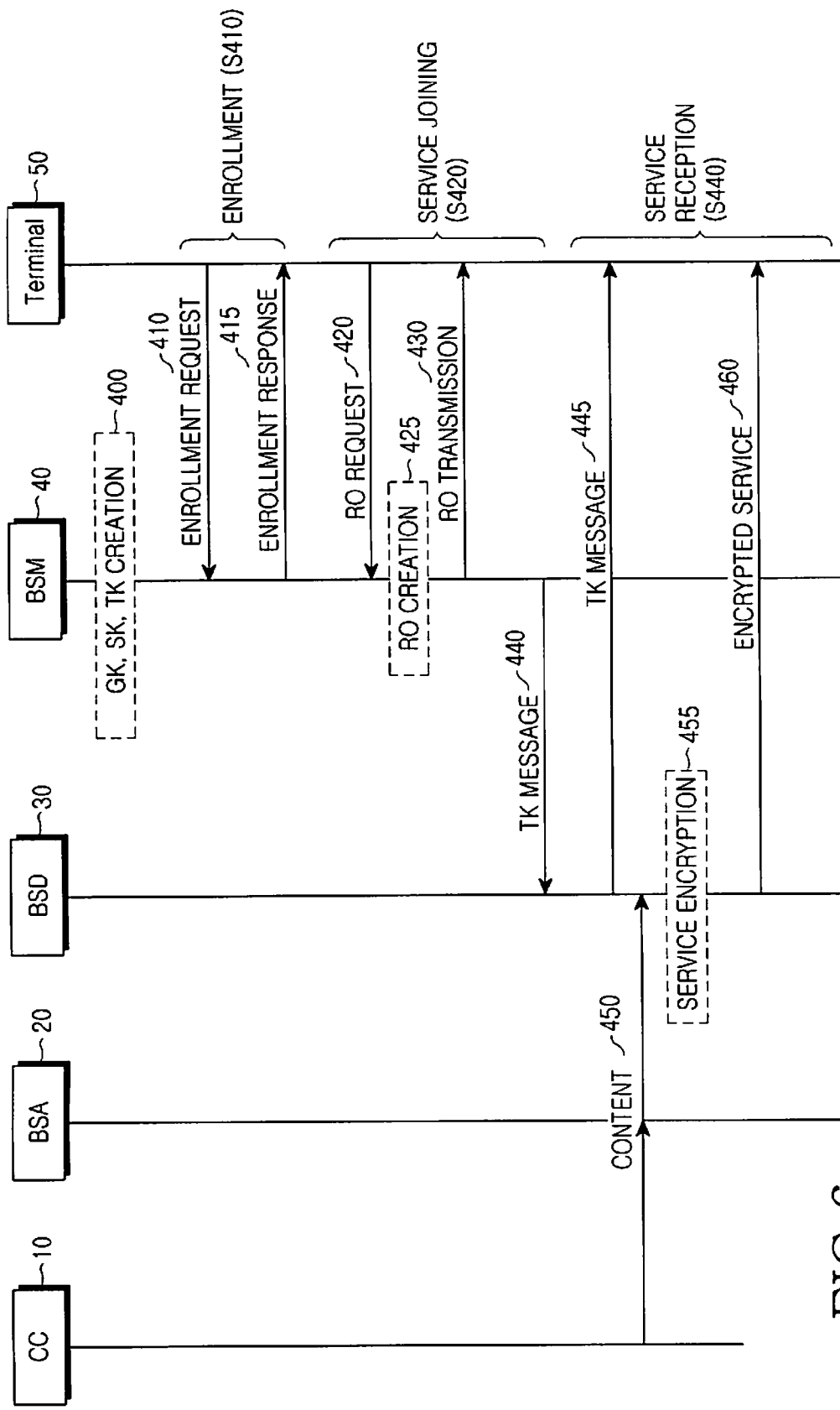
FIG. 6 is a flow diagram illustrating the flow of a message transmitted/received according to a service protection method in a bidirectional channel in accordance with the present invention.

First of all, step 400 in FIG. 6 is similar to step 200 in FIG. 4, and a service reception procedure (S440) including steps 440 to 470 is also similar to the service reception procedure of steps 250 to 270, of FIG. 4. Accordingly, detailed descriptions of these steps will be omitted for the sake of clarity.

In comparison with the service protection method over the broadcast channel according to one embodiment of the present invention, the terminal 50 cannot transmit a message directly to the broadcast network when the broadcast channel is used, but the service protection method using the bidirectional channel enables a message to be transmitted directly to the broadcast network. Thus, it is possible to directly exchange a message between the terminal 50 and the BSM 40.

Accordingly, in step 410 of FIG. 6, the terminal 50 transmits an enrollment request message directly to the SP-M component 42 of the BSM 40 over the bidirectional channel. The enrollment request message has a format as illustrated in FIG. 5A. In step 415, the SP-M component 42 of the BSM 40 transmits an enrollment response message to the terminal 50 over the bidirectional channel in response to the enrollment request message from the terminal 50. The enrollment response message has a format as illustrated in FIG. 5B, and includes information in which the group key is encrypted with the public key of the terminal 50. Through this encryption, the information can be transmitted in protected manner.

After receiving the enrollment response message, the terminal 50 executes verification for the enrollment response message. This means a procedure for checking whether the message transmitted from the SP-M component 42 of the BSM 40 is a correct message to be transmitted to the terminal 50. Thus, if failing in the verification, the terminal 50 ignores the enrollment response message delivered from the BSM 40. However, even when succeeding in the verification, the terminal 50 checks the time field of the enrollment response message format, and ignores the enrollment response message if the time field has a time delayed more than a predetermined amount. If succeeding in the verification of the electronic signature and the checking of the time field, the terminal 50 decrypts the encrypted GK with its own public key to acquire a GK.

Once the terminal 50 acquires the GK while executing the enrollment procedure as described above, in step 420, the terminal 50 transmits a service joining request message, i.e., a message for requesting an RO, directly to the SP-M component 42 of the BSM 40 over the bidirectional channel. Here, when the terminal 50 directly requests the service joining and acquires the service RO from the SP-M component 42 of the BSM 40, the terminal 50 is regarded as being joined in the service. The service joining request message has a format as illustrated in FIG. 5C, and includes the ID of a service which the terminal 50 desires to join. The RO created by the SP-M component 42 of the BSM 40 (in step 425) is transmitted to the terminal 50 having requested the service joining in step 430, and a message to be transmitted to the terminal 50 has a format as illustrated in FIG. 5d. The RO included in this message has a service key, and is encrypted with the group key for the sake of protection. Since the service joining procedure (S420) including steps 420 to 440 is different only in that the BSM 40 transmits the message over the bidirectional channel, a detailed description thereof will be omitted.

In the present invention, the RO or the TK message may be provided to the terminal anytime, regardless of a point of time when services are provided to the terminal. For example, after services have been previously provided to the terminal, the RO may be transmitted to the terminal. Otherwise, after the RO has been previously transmitted to a terminal, services to be executed may be provided to the terminal.

As describe above, the present invention enables system operation for service protection in a broadcast environment by defining an inter-structure and roles between entities included in a broadcast network.

While the invention has been shown and described with reference to a certain preferred embodiment thereof, it will be understood by those skilled in the art that various changes in form and details may be made therein without departing from the spirit and scope of the invention as defined by the appended claims and equivalents thereof.

What is claimed is:

1. An inter-entity coupling method for service protection in a broadcast environment including a terminal and a broadcast network, which includes a Broadcast Service Application (BSA), a Broadcast Service Distribution (BSD) and a Broadcast Service Management (BSM), the method comprising:

executing, by the terminal, enrollment for obtaining an encrypted group key for the terminal from a received enrollment response message, the group key being encrypted by a public key of the terminal;

requesting, by the terminal, a service joining;

receiving, by the terminal, a message including a Rights Object (RO) in response to the request for the service joining;

obtaining a service key by decrypting the RO using the group key, wherein the service key is an encryption key assigned when the terminal joins a service;

obtaining a traffic key from a traffic key message by using the service key for decryption;

receiving, by the terminal, an encrypted service from the BSD; and decrypting, by the terminal, the encrypted service using the traffic key;

wherein executing the enrollment comprises:

transmitting, by the terminal, an enrollment request message directly to an SP-Management (SP-M) component of the BSM over a bidirectional channel;

receiving, by the terminal, the enrollment response message via an SP-Key Distribution (SP-KD) component of the BSD broadcasting the enrollment response message, from the SP-M component of the BSM; or receiving, by the terminal, the enrollment response message directly from the SP-M component of the BSM over the bidirectional channel; and verifying, by an SP-Decryption (SP-D) component of the terminal, the enrollment response message, wherein the enrollment response message is generated in the SP-M component of the BSM, in response to the transmission of the enrollment request message.

2. The method as claimed in claim 1, wherein the step of executing the enrollment and the service joining procedures is effected by coupling an SP-Client (SP-C) component responsible for the enrollment and joining of the terminal and an SP-Management (SP-M) component responsible for encryption key creation of the BSM and joining management.

3. The method as claimed in claim 1, wherein the encrypted service is a service provided by a content provider to an SP-Encryption (SP-E) component of the BSD and encrypted by and thereafter broadcasted to the terminal by the SP-E component.

4. The method as claimed in claim 1, wherein the encrypted service is decrypted by an SP-Decryption (SP-D) component of the terminal, which decrypts the encrypted service transmitted from an SP-Encryption (SP-E) component of the BSD.

5. The method as claimed in claim 4, wherein the RO for the service, which is acquired when the enrollment and joining procedures are executed, is transmitted to the SP-D component of the terminal.

6. The method as claimed in claim 1, wherein the step of executing the enrollment procedure comprises:

creating, by an SP-Management (SP-M) component of the BSM, the service key;

if an enrollment request message is received from the terminal through a specific agency, creating, by the SP-M component of the BSM, the enrollment response message including the group key for a group to which the terminal belongs;

transmitting the enrollment response message to an SP-Key Distribution (SP-KD) component of the BSD broadcasting the enrollment response message to the terminal;

broadcasting, by SP-KD component of the BSD, the enrollment response message; and when the enrollment response message is received, verifying, using an SP-Decryption (SP-D) component of the terminal, the enrollment response message to acquire the group key.

7. The method as claimed in claim 6, wherein the step of acquiring the group key comprises:

receiving, at the terminal, the enrollment response message including identification information and transmission time information; and decrypting the encrypted group key included in the enrollment response message with the public key of the terminal.

8. The method as claimed in claim 1, wherein the step of executing the service joining procedure comprises:

creating, by an SP-Management (SP-M) component of the BSM, the service key and the traffic key;

if a service joining request message is received from the terminal through a specific agency, creating, by the SP-M component of the BSM, an RO using the service key, the RO stipulating rights-of-use for the service;

creating a service joining response message, and delivering the created service joining response message to an SP-Key Distribution (SP-KD) component of the BSD;

broadcasting, by the SP-Decryption (SP-KD) component of the BSD, the service joining response message; and when the service joining response message is received, verifying, by the SP-Decryption (SP-D) component of the terminal, the service joining response message, and thereafter decrypting the encrypted RO, which has been acquired in the enrollment procedure, to acquire the RO.

9. The method as claimed in claim 1, wherein the step of executing the service joining procedure comprises:

creating, by an SP-Management (SP-M) component of the BSM, the service key and the traffic key;

if a service joining request message is received from the terminal over a bidirectional channel, creating, by the SP-M component of the BSM, an RO using the service key, the RO stipulating rights-of-use for the service;

creating a service joining response message having the created RO, by the SP-M component of the BSM, and transmitting the created service joining response message; and when the service joining response message is received, verifying, by an SP-Decryption (SP-D) component of the terminal, the service joining response message, and thereafter decrypting the encrypted RO, which has been acquired in the enrollment procedure, to acquire the RO.

10. The method as claimed in claim 1, wherein the step of acquiring the traffic key comprises:

broadcasting, by an SP-Key Distribution (SP-KD) component of the BSD, the traffic key message, in which the encrypted traffic key is encrypted using the service key, to the terminal; and when the traffic key message is received, decrypting, by an SP-Decryption (SP-D) component of the terminal, the encrypted traffic key using the service key to acquire the traffic key.

11. The method as claimed in claim 10, wherein the traffic key is an encryption key used for encrypting the service.

12. A terminal for service protection in a broadcasting environment, the terminal comprising:

a secure storage of the terminal for storing one or more encryption keys;

a registration module for receiving a group key in a registration process;

a Digital Rights Management (DRM) module for executing enrollment for acquiring the group key for the terminal from a received enrollment response message, the group key being encrypted by a public key of the terminal;

a communication module for receiving a message comprising a Rights Object (RO) in response to a service joining request, and receiving a traffic key included in a traffic key message;
a rights management module for acquiring a service key by decrypting the RO using the group key; and
a key stream management module for acquiring the traffic key from the traffic key message by using the service key, and decrypting an encrypted service by using the traffic key upon receiving the encrypted service from a Broadcast Service Distribution (BSD),
wherein the service key is an encryption key assigned when the terminal joins the service, and
wherein executing the enrollment comprises:
    transmitting, by the terminal, an enrollment request message directly to an SP-Management (SP-M) component of the BSM over a bidirectional channel;
    receiving, by the terminal, the enrollment response message via an SP-Key Distribution (SP-KD) component of the BSD broadcasting the enrollment response message, from the SP-M component of the BSM; or
    receiving, by the terminal, the enrollment response message directly from the SP-M component of the BSM over the bidirectional channel; and
    verifying, by an SP-Decryption (SP-D) component of the terminal, the enrollment response message,
    wherein the enrollment response message is generated in the SP-M component of the BSM, in response to the transmission of the enrollment request message.

13. The terminal of claim 12, wherein the communication module receives the traffic key message and the encrypted service.

14. The terminal of claim 12, wherein the rights management module acquires the RO from the received message by using the decrypted group key, and the RO comprises the service key which is an encryption key assigned when the terminal joins the service.

15. The terminal of claim 12, wherein the traffic key is an encryption key used to encrypt the service.

16. The terminal of claim 12, wherein the communication module transmits an enrollment request message to a Broadcast Service Management (BSM) and receives the enrollment response message from the BSM in response to the enrollment request message through the BSD, the enrollment response message comprising the group key corresponding to a group to which the terminal belongs.

17. The terminal of claim 16, further comprising an authentication module for verifying the enrollment request message and the enrollment response message.

18. The terminal of claim 17, wherein the authentication module verifies terminal identification information and transmission time information in the enrollment response message, and the key stream management module decrypts the encrypted group key included in the enrollment response message by using the public key of the terminal after receiving the enrollment response message.

19. The terminal of claim 12, further comprising a service decryption module for decrypting the service encrypted by the BSD.

* * * * *